United States Patent [19]

Stella et al.

[11] Patent Number: 4,569,578

[45] Date of Patent: Feb. 11, 1986

[54] DISK CAMERA HAVING DISK CARRYING PEEL-APART FILM UNITS

[75] Inventors: Joseph A. Stella, Peabody; Joseph B. Wright, Marblehead, both of Mass.

[73] Assignee: Polaroid Corporation, Cambridge, Mass.

[21] Appl. No.: 646,517

[22] Filed: Sep. 4, 1984

[51] Int. Cl.[4] .................. G03B 17/52; G03B 29/00
[52] U.S. Cl. .................................... 354/76; 354/86; 354/121
[58] Field of Search .............. 354/77, 78, 76, 83–86, 354/120, 121

[56] References Cited

U.S. PATENT DOCUMENTS

| | | | |
|---|---|---|---|
| 3,255,670 | 6/1966 | Lasermann | 90/62 |
| 3,350,990 | 11/1967 | Finelli et al. | 95/13 |
| 3,369,469 | 2/1968 | Downey | 95/13 |
| 3,369,470 | 2/1968 | Downey | 95/13 |
| 3,421,423 | 1/1969 | Downey et al. | 95/13 |
| 3,437,023 | 4/1969 | Downey et al. | 95/13 |
| 3,437,024 | 4/1969 | Downey et al. | 95/13 |
| 3,446,131 | 5/1969 | Cook et al. | 95/13 |
| 3,455,222 | 7/1969 | Downey | 95/13 |
| 3,525,293 | 8/1970 | Harvey | 95/13 |
| 3,541,937 | 11/1970 | Nerwin | 95/13 |
| 3,541,938 | 11/1970 | Harvey | 95/13 |
| 3,541,939 | 11/1970 | Kemp | 95/30 |
| 3,541,940 | 11/1970 | Bertnick et al. | 95/30 |
| 3,575,081 | 4/1971 | Nerwin | 95/12 |
| 3,614,920 | 10/1971 | Kamp | 95/13 |
| 3,636,844 | 1/1972 | Kamp | 95/13 |
| 3,648,527 | 3/1972 | Kamp | 74/17.5 |
| 4,114,166 | 9/1978 | Driscoll et al. | 354/76 |
| 4,132,471 | 1/1979 | Svatek et al. | 354/86 |
| 4,265,525 | 5/1981 | Stella et al. | 354/76 |

Primary Examiner—John Gonzales
Attorney, Agent, or Firm—Leslie J. Payne

[57] ABSTRACT

There is disclosed a photographic apparatus of the instant developing type which permits exposing, processing and viewing of the film without the necessity of removing the film from the camera. Included is a film disk containing a plurality of film assemblies, each including a strippable negative sheet which is removed from the film assembly at a viewing station for facilitating viewing of the positive image transparency at such viewing station.

9 Claims, 5 Drawing Figures

DISK CAMERA HAVING DISK CARRYING PEEL-APART FILM UNITS

BACKGROUND OF THE INVENTION

This invention relates in general to photographic apparatus. More particularly, it is directed to a pocket-size still camera of the self-developing type, wherein a plurality of positive film transparencies can be sequentially exposed, processed and viewed without the necessity of removing them from the camera.

Self-developing cameras are extremely popular for a number of reasons including the fact that they have the facility of offering immediate feedback regarding the quality of a recently photographed scene. This enables a photographer to retake a scene so as to obtain a desired photograph. Most instant cameras, however, provide a positive print format of a size much larger than the negative size format of a small or miniature camera in which the film is exposed and removed from the camera for subsequent laboratory processing. Accordingly, the print format size of the film limits miniaturization of these instant cameras.

It has been found that small or pocket-size photographic cameras are popular among travellers and other amateur photographers because such cameras free them from handling relatively bulky larger cameras.

Towards the end of addressing this situation, miniature self-developing cameras have been developed in which so-called instant slides are exposed and processed. Ordinarily, these positive image transparencies are premounted in a frame for facilitating their subsequent projection.

For representative examples of the prior art relating to miniature self-developing cameras reference may be made to the following U.S. Pat. Nos.: 2,854,903; 3,255,670; 3,350,990; 3,369,469; 3,369,470; 3,421,423,; 3,437,023,; 3,437,024; 3,446,127; 3,446,131; 3,455,222; 3,541,939; 3,541,940; 3,541,937; 3,541,938; 3,575,081; 3,525,293; 3,614,920; 3,648,527; 3,636,844; 4,114,166; 4,132,471; and 4,265,525.

To varying degrees the cameras described in the above-noted patents with the exception of the latter three require the photographer to manually handle the transparencies following processing in order to view them. Handling is, of course, clearly disadvantageous because the possibility for damaging the transparencies exist. Moreover, the individual film units because of their small size require careful handling and storing. Such handling and storing is disadvantageous from a cost and convenience standpoint.

In regard to U.S. Pat. No. 4,114,166 it discloses a miniature self-developing camera having a removable film cassette for retaining a supply of unexposed film units and a removable storage cassette for holding a stack of exposed film units. While the slides can be viewed without touching them, there is required a plurality of film cassettes, a relativetly complicated slide transfer mechanism between such cassettes and a viewing system external to the camera.

U.S. Pat. No. 4,132,471 discloses a self-developing camera having extensible and retractable housing sections. Also, the camera is required to be placed in the extended condition for forming a retention and/or imbibition chamber for receiving successive exposed film units advanced by the pressure rollers.

In regard to U.S. Pat. No. 4,265,525 there is provided a camera, wherein a plurality of film transparencies are mounted on a disk for sequential exposure, processing and viewing. The camera, while achieving the foregoing, nevertheless requires a relatively complicated film disk cassette in which access and removal of the film units are relatively difficult. Moreover, it requires a rotatable slide cooperable with the cassette for permitting such exposure and viewing. Further, the film transparency includes a negative sheet which tends to minimize clarity of the images when viewed.

SUMMARY OF THE INVENTION

It is an object of this invention to overcome the noted drawbacks with respect to such miniature cameras. In accordance with the present invention there is provided a photographic apparatus comprising a housing assembly which provides a film receiving compartment. Connected to the housing assembly is means for optically directing scene light along a path to a focal plane at an exposure station associated with the compartment. Included is means operable for unblocking and blocking scene light along the path so as to define an exposure interval at the focal plane. A carrier is insertable into the compartment. A plurality of film unit assemblies mounted on the carrier are in spaced relationship so that successive ones can be exposed and then viewed. Each of the units is of the instant developing type which provides upon exposure and processing a positive image transparency. Each of the units including in successive juxtaposed relation a positive sheet, a reservoir of rupturable processing fluid and a strippable negative sheet. Means for mounting and moving the carrier along a path are provided so that successive ones of the film assemblies are successively positioned at the exposure station and a viewing station. There is provided means for releasing and spreading the processing fluid across the assembly following exposure and before viewing. Referring back to the housing assembly it includes means for permitting access a the negative sheet at the viewing station so as to allow a negative sheet to be stripped from its film assembly and thereby facilitate viewing of the remaining positive transparency at the viewing station.

In a preferred embodiment, the means for providing access and viewing includes a pair of doors mounted for movement between open and closed conditions. Each of the doors is on an opposite side of the carrier and is aligned with the other so that the positive sheet may be viewed when the doors are in the open condition. Additionally, the negative sheet can be removed when the door adjacent the negative sheet is in the open condition.

In another preferred embodiment the carrier is defined by a disk having a plurality of generally radially extending and circumferentially spaced slots formed therein. Each of the slots is formed to removably accept and support respective ones of the film unit assemblies. In this regard a film unit assembly includes a transparent support substrate having thereon in successive juxtaposed relationship a positive sheet, the reservoir of processing fluid and the strippable negative sheet.

Among the objects of the invention are, therefore, the provision of a photographic apparatus in which film assembly transparencies can be exposed, processed and viewed without taking them out of the apparatus; the provision of a photographic apparatus of the character last noted wherein the tranparencies are of the self-developing kind; the provision of a photographic apparatus of the last noted kind in which the transparencies include a strippable negative sheet; the provision of such a photographic apparatus which includes doors at a viewing station to facilitate removal of the negative sheet and thereby viewing of the positive transparency; the provision of a film disk carrying a plurality of circumferentially spaced film assemblies of the last noted kind which are carried on a substrate having a portion thereof which is transparent so as to permit viewing and projection of the transparency; and, the provision of such film assemblies which are individually removably mounted on the film disk.

Other objects and further scope of applicability of the present invention will become apparent from the detailed description to follow when taken in conjunction with the accompanying drawings wherein like parts are designated by like reference numerals.

DETAILED DESCRIPTION

Figure 1:
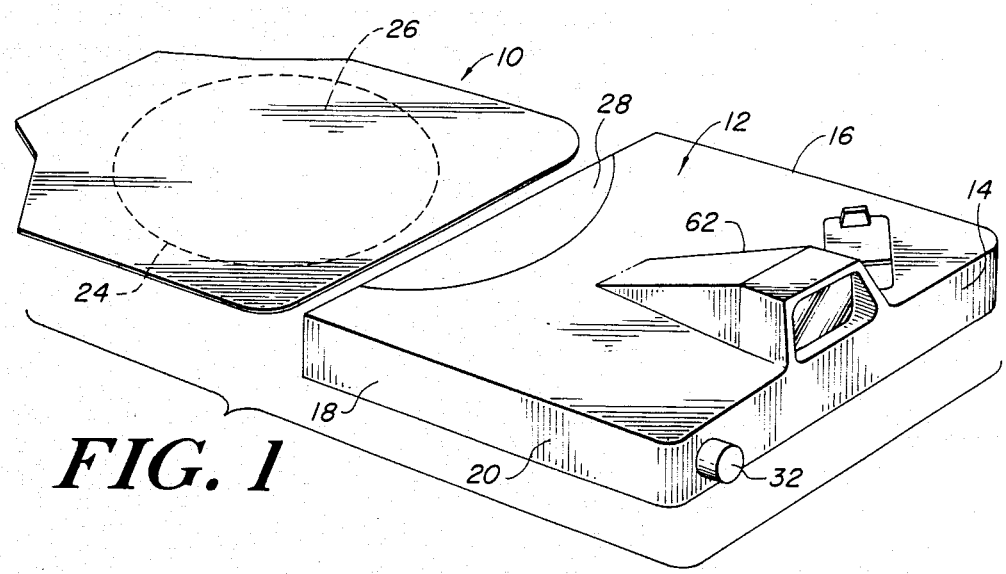
FIG. 1 is a perspective view showing an improved photographic apparatus made in accordance with the principles of the present invention.

Reference is now made to the drawings for illustrating an improved photographic apparatus 10 made in accordance with the principles of the present invention.

As depicted the photographic apparatus 10 includes a housing 12 having a generally parallelpiped construction including front, top, side and bottom walls 14, 16, 18 and 20; respectively. The housing 12 defines a light-tight film cassette receiving chamber 22 for receipt therein of a film disk 24.

As shown in FIG. 1, the film disk 24 is enclosed within a standard camera back pouch 26 prior to use in the camera. The pouch 26 serves to protect the film from damage because of ambient light. The camera back pouch 26 and the film disk 24 are to be inserted into the film cassette receiving chamber 22. To allow this, a rear access door 28 is hinged at 30 to the housing 12 so as to be pivotal between open and closed positions. When in the open position there is provided access to the film cassette chamber 22. When in the closed position the door access 28 is latched by a suitable latching device (not shown) to help form a light-tight chamber. The front wall 14 is provided with a shutter button 32 which upon actuation thereof will commence a photographic cycle. The shutter button 32 is associated with a shutter actuating means (not shown) by which the shutter arrangement 60 may be operated in a known manner to define an exposure.

Formed in the bottom wall 20 is a central opening 34 which receives a portion of the film advancing mechanism 36.

Included in the film advancing mechanism 36 is a drive spindle 38 which has longitudinally extending drive lugs 40. The lugs 40 are contructed to engage a complementary shaped recesses 42 formed on the hub of the film disk 24. The drive spindle 38 is biased upwardly by a yieldable compression spring 44 acting between the inner surface of the bottom wall 20 and a disk supporting flange 46. In this manner when the film disk 24 and pouch 26 are inserted into the chamber 22, the former will overcome the bias of the compression spring 44. Hence, when the central opening in the film disk 24 is in registry with the lugs 40 of the drive spindle 38, the compression spring 44 urges the latter into driving engagement with the former. Accordingly, as a film advancing knob 48 is rotated so is the film disk. As will be explained later, the film disk 24 will be subsequently advanced such that successive film units assemblies 50 can be presented to a focal plane at the exposure station 52 previously exposed film units may be positioned at a viewing station 54.

Figure 4:
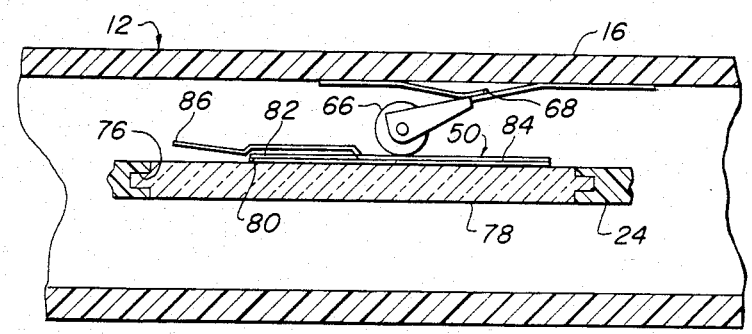
FIG. 4 is a sectional view taken along the section line 4—4 appearing in FIG. 2 and showing the initiation of the processing step; and, FIG. 5 is a sectional view taken along the section line 5—5 appearing in FIG. 2 and showing both viewing doors being in the open or viewing condition at the viewing station.
Figure 3:
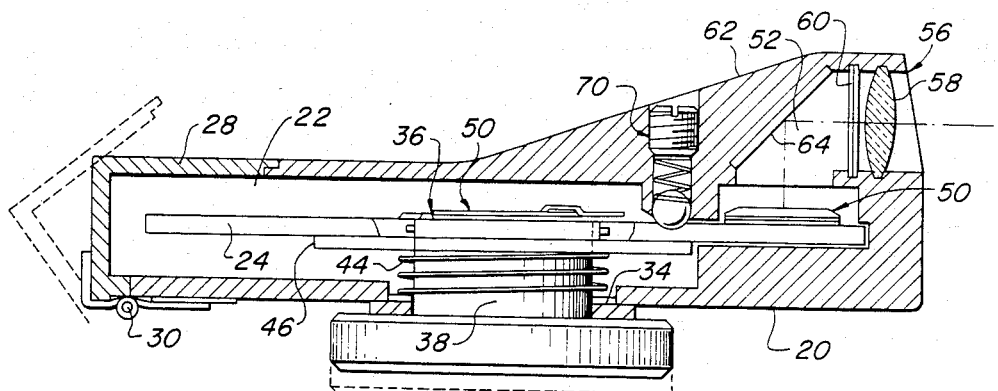
FIG. 3 is an elevated cross sectional view of the photographic apparatus shown in FIG. 1.

As more clearly shown in FIG. 3, the photographic apparatus 10, is provided with an optical system 56 by which light images of a scene to be photographed may be formed at a focal plane. This optical system 56 includes an objective lens 58 and a shutter blade arrangement 60 mounted in a wall formed in a housing projection 62. Also mounted in the housing projection 60 is a mirror 64 which housed in the interior of the housing projection 62. A processing roller 66 is biased so as to contact successive film unit assemblies 50 so that it effects release of the processing fluid which is distributed across the image forming area of a film unit. As shown in FIG. 4 a pair of biasing members 68 (only one shown) contacts stub shafts on the processing roller 66.

For detenting the film disk 24 in the manner intended, there is provided spring-biased detent assembly 70. The detent assembly 70 is also housed in the interior of the housing projection 62 and cooperates with spaced recess 73 the film disk 24, so as to permit indexing of the disk as noted.

Figure 5:
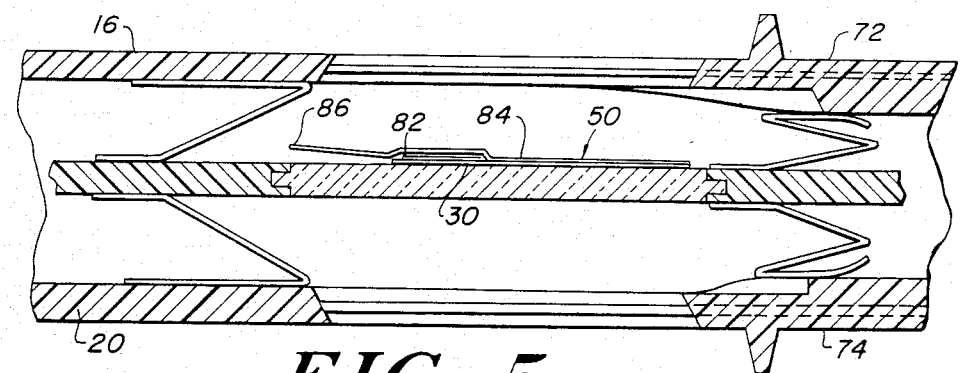
Figure 2:
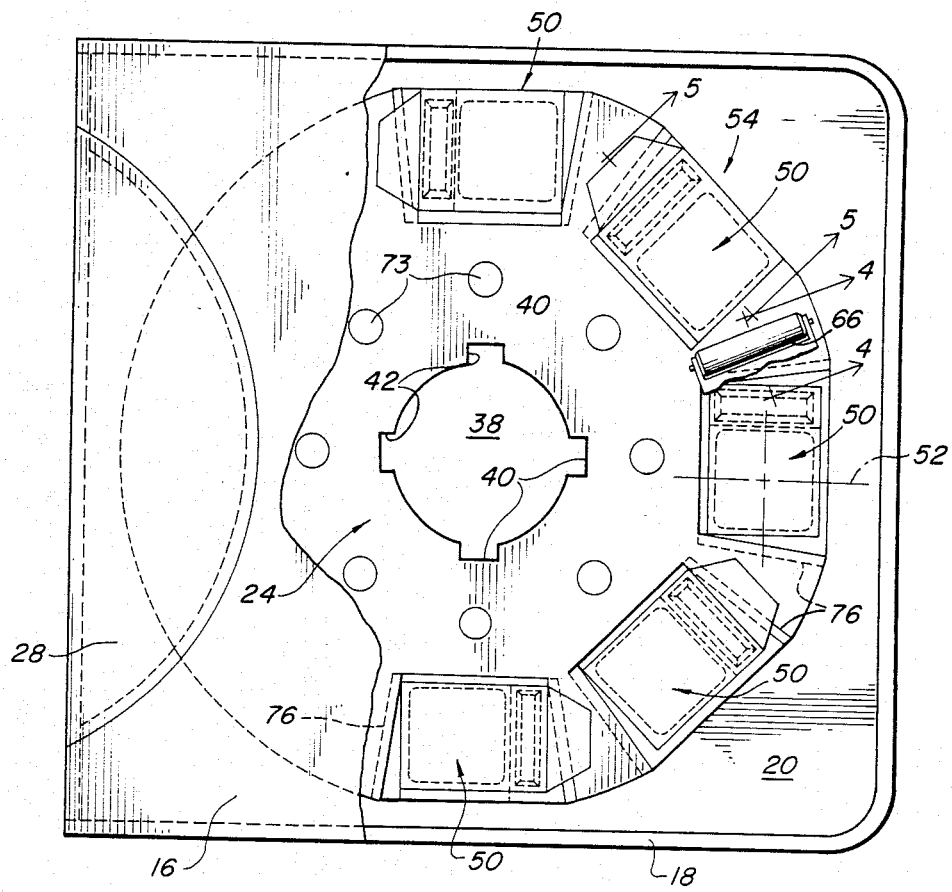
FIG. 2 is a plan view of such a photographic apparatus with a segment removed for revealing more of this invention.

As best viewed in FIGS. 1, 4 and 5 there is mounted for slidable movement in the top and bottom walls 16 and 20; respectively, viewing doors 72 and 74. The doors 72, 74 are normally in a closed condition. Whenever it is desired to view a film transparency following exposure, both doors are moved manually to open conditions (See FIG. 5). An operator may, after an appropriate imbibition time, remove a negative strip sheet from the film unit assembly 50 through the viewing door 72. By virtue of the viewing doors being opened, an operator can easily view and evaluate the transparency just exposed and processed. Accordingly he can retake the scene if desired. Although the present embodiment, discloses manually movable viewing doors, the present invention contemplates that such doors could be operated automatically. As a result of the foregoing a separate external viewing system for viewing the transparencies is unnecessary. The present invention also contempates that other viewing stations could be provided. For example, a second pair of viewing doors (not shown) could be in aligned and overlapping arrangement at an adjacent indexed station of the film disk 24. As noted, the viewing door 70 permits an operator to gain access to the film unit assembly mounted on the film disk at the viewing station 54.

In this embodiment, the film units assemblies are the self-developing transparency type which are of the peel-apart variety. Accordingly, the operator removes the negative strip sheet from the top of the unit 50 following exposure for better viewing of the remaining positive transparency.

Reference is again made to the film disk 24. As noted the film disk has a plurality of generally sector shaped film slots 76. Each slot 76 includes a pair of longitudinally extending guides for slidably receiving therein the film unit assembly 50. In this manner the film units 50 can easily be inserted into or removed from the slots 76. This provides great convenience for a user since film unit assemblies can be replaced. Moreover, the walls of the slots 76 are slightly tapered so as to provide a self-orienting feature to the units. This assists the user in properly positioning the transparency. The film disk 24 is made of an opaque material.

Reference is made to FIGS. 4 and 5 for better showing the film unit assembly 50. As shown it includes a transparent plastic substrate 78, having secured thereon the film unit assembly 50. Included in the film unit assembly 50 is a transparent positive or image receiving layer 80, a rupturable pod of processing fluid 82 and strippable negative sheet 84 with pull tab 86.

After having described the foregoing construction, it is believed the operation of the photographic apparatus 10 is apparent. To supplement such description, however, it will be appreciated that the shutter button 32 is pressed to commence a photographic cycle. During such cycle the shutter blade arrangement is operated so as to define a complete exposure. The termination of exposure can be indicated by a light or some other device so as to allow the user to rotate the drive spindle to commence processing at the exposed film unit assembly. Rotation releases the spring biased detent assembly 70 and causes the exposed film unit assembly 50 to travel from the exposure station 52 to the viewing station 54. The pod 82, at the leading edge, will be ruptured and the fluid spread across the image receiving area by the spring-biased roller 66. A short imbibing time period for completion of the processing is provided at the viewing station 54. During this period, of course, the viewing doors 72, 74 remain closed. Indication of the end of such a period can be provided by an indicator light which is provided by an indicator light which is energized at a prescribed interval following exposure. Suitable circuitry not forming part of this invention can be provided for such a result.

When it is desired to view the images, the doors 72, 74 are opened. The negative sheet 84 can be removed by pulling upwardly on the pull tab 86. Once the sheet 84 is removed, the positive transparent sheet 80 remains in overlying relationship to the transparent substrate 78. Thus, the positive transparency 78 can be viewed. Because the negative sheet 84 is removed, the recorded images have greater clarity for projection and viewing.

Following exposure of all the film units 50, the disk 24 can be removed from the receiving chamber 24. This is accomplished by pulling downwardly on the film advance knob 48 and overcoming the bias of the compression spring 44. The rear access door 28 is, of course, in the open condition and the exposed film disk 24 can be removed easily for subsequent projection.

In accordance with the invention, the film disk 24 is provided with removable film units 50. Hence, a user can then replace easily selected certain ones of the film units. Furthermore the tapered edge of the film unit assembly 50 insures that a user properly orient the film unit 50 in the film disk 24.

Since certain changes may be made in the abovedescribed apparatus without departing from the scope of the invention herein involved, it is intended that all matter contained in the description or shown in the accompanying drawings shall be interpreted as illustrative and not in a limiting sense.

What is claimed is:

1. A photographic camera comprising:

an exposure station;

a housing assembly containing said exposure station and configured to receive a carrier containing a plurality of film units mounted in a planar array with a first one of the film units positioned at said exposure station, each of the film units including a strippable negative sheet, an image receiving sheet in superposed relationship with respect to its associated strippable negative sheet and a rupturable pod of processing fluid;

a viewing station;

means for selectively exposing the film unit positioned at said exposure station to scene light to record a latent image of the scene in that film unit's strippable negative sheet;

means for advancing the carrier to sequentially position subsequent unexposed film units at said exposure station and exposed ones of the film units at said viewing station; and means for effecting the rupture of the pod associated with each film unit and the spreading of the fluid released therefrom across that film unit to effect the formation of a viewable image in that film unit's image-receiving sheet from the latent image in its strippable negative sheet responsive to said advancing means advancing that film unit after its exposure from said exposure station into said viewing station, said housing assembly including means for providing access to each film unit after the processing thereof by its released processing fluid to facilitate the removal of that film units strippable negative sheet, whereby an operator may view the image formed in that film unit's image receiving sheet at said viewing station.

2. The camera of claim 1 wherein said access providing means is located adjacent said viewing station whereby the strippable negative sheet may be removed from an exposed processed film unit when it is positioned within said viewing station.

3. A photographic apparatus comprising:

a housing assembly which provides a film receiving compartment;

means connected to said housing assembly for optically directing scene light along a path to a focal plane at an exposure station associated with said compartment;

means operable for unblocking and blocking scene light along the path so as to define an exposure interval at the focal plane;

a carrier insertable into said chamber;

a plurality of film unit assemblies mounted on said carrier in spaced relationship so that successive ones can be exposed and then viewed;

each of said film assemblies being of the instant developing type which provides upon exposure and processing a positive image transparency, each of said film assemblies including in successive juxtaposed relation an image receiving sheet, a reservoir of rupturable processing fluid and a strippable negative sheet;

means for mounting and moving said carrier along a path so that successive ones of said film assemblies are positionable at the exposure station and then a viewing station;

means for releasing the processing fluid and spreading it across said image receiving sheet following exposure and before viewing; and said housing assembly including means for permitting access to the negative sheet at the viewing station so as to allow the negative sheet to be stripped from its film assembly and thereby facilitating viewing of the image receiving sheet at the viewing station.

4. The apparatus of claim 3 wherein said means for providing access and viewing includes a pair of doors mounted for movement between open and closed conditions, each of said doors being on opposite sides of said carrier and being aligned with the other so that the image receiving sheet may be viewed when said doors are in the open condition, and the negative sheet can be removed when one of said doors immediately adjacent the negative sheet is in the open condition.

5. The apparatus of claim 3 wherein said carrier is defined by a disk having a plurality of radially extending and circumferentially spaced slots formed therein, each of said slots being formed to removably accept and support respective ones of said film unit assemblies.

6. The apparatus of claim 5 wherein each of said film unit assemblies includes a transparent support substrate having thereon in said successive juxtaposed relationship the image receiving sheet, the reservoir of processing fluid and the strippable negative sheet.

7. The apparatus of claim 6 wherein each of said slots has a generally inwardly tapered walls and each of said substrates has a corresponding and complementary tapered configuration to thereby facilitate removable receipt and proper orientation of said assemblies in said slots.

8. The apparatus of claim 5 wherein said means for mounting and moving said disk includes a yieldably biased and rotatable driving spindle, whereby when said disk is inserted into said compartment said spindle is urged against its bias outwardly, until the biasing thereof urges said spindle inwardly to be coupled to a corresponding driving portion of said disk, and said spindle can be pulled outwardly against its bias and be decoupled from said disk, thereby allowing withdrawal of said disk from said compartment.

9. The apparatus of claim 8 wherein said mounting and moving means includes a spring biased detent arrangement for releasably maintaining said disk in a given rotational positions.

* * * * *